(12) United States Patent  
Rahman et al.

(10) Patent No.: US 7,787,361 B2
(45) Date of Patent: Aug. 31, 2010

(54) HYBRID DISTANCE VECTOR PROTOCOL FOR WIRELESS MESH NETWORKS

(75) Inventors: Shahriar Rahman, Morgan Hill, CA (US); Robert Bernard O'Hara, Jr., Santa Clara, CA (US); Johannes Petrus Kruys, Harmelen (NL)

(73) Assignee: Cisco Technology, Inc., San Jose, CA (US)

( * ) Notice: Subject to any disclaimer, the term of this patent is extended or adjusted under 35 U.S.C. 154(b) by 864 days.

(21) Appl. No.: 11/364,020

(22) Filed: Feb. 27, 2006

(65) Prior Publication Data

US 2007/0025274 A1 Feb. 1, 2007

Related U.S. Application Data

(60) Provisional application No. 60/708,443, filed on Aug. 15, 2005, provisional application No. 60/703,829, filed on Jul. 29, 2005.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ............... 370/217; 370/242; 370/244; 370/248; 370/250; 370/254

(58) Field of Classification Search ............ 370/242, 370/248, 250, 254, 244, 217, 360
See application file for complete search history.

(56) References Cited

U.S. PATENT DOCUMENTS 4,365,331 A 12/1982 Biba et al.

(Continued)

FOREIGN PATENT DOCUMENTS

EP 0567217 10/1993

(Continued)

OTHER PUBLICATIONS

Cisco Systems, Inc., "Configuration and Management", printed from http://www/cisco.com/univercd/cc/td/doc/product/lan/28201900/ 1928v67x/ 19icg67x/19icoutb.htm, on May 27, 1999, 62 pages.

*Primary Examiner*—Salman Ahmed
*Assistant Examiner*—Peter Chau
(74) *Attorney, Agent, or Firm*—Stolowitz Ford Cowger LLP

(57) ABSTRACT

A method of hybrid route discovery in a mesh network is described. The method comprises the optional designation of a root node of the mesh network and formatting a route request message at an originating mesh point, where the route request messages include a hop limit parameter. If a root node has been configured, the route request is responded to with a message that describes the route to the root. If a direct route between two nodes is required, the route request message is broadcast from the originating mesh point, and the hop limit parameter limits the number of times the route request message will be forwarded. The originating mesh point receives a unicast route reply message from a neighboring mesh point, after the neighboring mesh point received the route request message. Finally, a route connecting the originating mesh point and the destination mesh point is established.

20 Claims, 9 Drawing Sheets

U.S. PATENT DOCUMENTS

| | | | |
|---|---|---|---|
| 4,939,728 A | 7/1990 | Markkula, Jr. et al. | |
| 5,008,882 A * | 4/1991 | Peterson et al. | 370/406 |
| 5,136,580 A | 8/1992 | Videlock et al. | |
| 5,138,615 A * | 8/1992 | Lamport et al. | 370/400 |
| 5,150,464 A | 9/1992 | Sidhu et al. | |
| 5,224,099 A | 6/1993 | Corbalis et al. | |
| 5,251,205 A | 10/1993 | Callon et al. | |
| 5,274,631 A | 12/1993 | Bhardwaj | |
| 5,282,270 A | 1/1994 | Oppenheimer et al. | |
| 5,309,433 A | 5/1994 | Cidon et al. | |
| 5,345,446 A | 9/1994 | Hiller et al. | |
| 5,361,256 A | 11/1994 | Doeringer et al. | |
| 5,365,524 A | 11/1994 | Hiller et al. | |
| 5,367,635 A | 11/1994 | Bauer et al. | |
| 5,383,179 A | 1/1995 | Saini et al. | |
| 5,388,213 A | 2/1995 | Oppenheimer et al. | |
| 5,473,599 A | 12/1995 | Li et al. | |
| 5,473,607 A | 12/1995 | Hausman et al. | |
| 5,502,725 A | 3/1996 | Pohjakallio | |
| 5,515,376 A | 5/1996 | Murthy et al. | |
| 5,561,669 A | 10/1996 | Lenney et al. | |
| 5,570,360 A | 10/1996 | Klausmeier et al. | |
| 5,583,862 A | 12/1996 | Callon | |
| 5,610,905 A | 3/1997 | Murthy et al. | |
| 5,678,006 A | 10/1997 | Valizadeh et al. | |
| 5,708,654 A * | 1/1998 | Arndt et al. | 370/242 |
| 5,712,981 A | 1/1998 | McKee et al. | |
| 5,734,654 A | 3/1998 | Shirai et al. | |
| 5,740,171 A | 4/1998 | Mazzola et al. | |
| 5,751,710 A | 5/1998 | Crowther et al. | |
| 5,796,732 A | 8/1998 | Mazzola et al. | |
| 5,802,042 A | 9/1998 | Natarajan et al. | |
| 5,802,047 A | 9/1998 | Kinoshita | |
| 5,802,054 A | 9/1998 | Bellenger | |
| 5,835,720 A | 11/1998 | Nelson et al. | |
| 5,848,242 A | 12/1998 | Behaghel et al. | |
| 5,854,901 A | 12/1998 | Cole et al. | |
| 5,867,666 A | 2/1999 | Harvey | |
| 5,870,386 A | 2/1999 | Perlman et al. | |
| 5,872,783 A | 2/1999 | Chin | |
| 5,918,016 A | 6/1999 | Brewer et al. | |
| 5,926,101 A | 7/1999 | Dasgupta | |
| 5,949,786 A | 9/1999 | Bellenger | |
| 5,959,990 A | 9/1999 | Frantz et al. | |
| 5,964,841 A | 10/1999 | Rekhter | |
| 5,991,810 A | 11/1999 | Shapiro et al. | |
| 6,018,770 A | 1/2000 | Little et al. | |
| 6,047,376 A | 4/2000 | Hosoe | |
| 6,055,236 A | 4/2000 | Nessett et al. | |
| 6,055,561 A | 4/2000 | Feldman et al. | |
| 6,092,196 A | 7/2000 | Reiche | |
| 6,256,306 B1 | 7/2001 | Bellenger | |
| 6,377,987 B1 | 4/2002 | Kracht | |
| 6,445,710 B1 | 9/2002 | Perlman et al. | |
| 6,459,700 B1 | 10/2002 | Hoang | |
| 6,545,982 B1 | 4/2003 | Murthy et al. | |
| 6,549,786 B2 | 4/2003 | Cheung et al. | |
| 6,570,875 B1 | 5/2003 | Hegde | |
| 6,628,620 B1 * | 9/2003 | Cain | 370/248 |
| 6,741,555 B1 * | 5/2004 | Li et al. | 370/229 |
| 6,772,219 B1 | 8/2004 | Shobatake | |
| 6,952,421 B1 * | 10/2005 | Slater | 370/401 |
| 7,145,916 B2 | 12/2006 | McNeil et al. | |
| 7,173,934 B2 | 2/2007 | Lapuh et al. | |
| 7,246,173 B2 * | 7/2007 | Le et al. | 709/238 |
| 7,649,884 B1 * | 1/2010 | Ahmed et al. | 370/390 |
| 2001/0034793 A1 * | 10/2001 | Madruga et al. | 709/238 |
| 2002/0031107 A1 * | 3/2002 | Li et al. | 370/338 |
| 2002/0049561 A1 * | 4/2002 | Garcia-Luna-Aceves et al. | 702/182 |
| 2002/0150041 A1 * | 10/2002 | Reinshmidt et al. | 370/216 |
| 2002/0152321 A1 * | 10/2002 | Le et al. | 709/238 |
| 2002/0176370 A1 * | 11/2002 | Ohba et al. | 370/252 |
| 2002/0196792 A1 | 12/2002 | McNeil et al. | |
| 2003/0020992 A1 * | 1/2003 | Child | 359/172 |
| 2003/0058804 A1 | 3/2003 | Seleh et al. | |
| 2003/0079030 A1 * | 4/2003 | Cocotis et al. | 709/229 |
| 2003/0101279 A1 * | 5/2003 | Maheshwari | 709/241 |
| 2003/0126299 A1 * | 7/2003 | Shah-Heydari | 709/252 |
| 2003/0142680 A1 * | 7/2003 | Oguchi | 370/400 |
| 2004/0165595 A1 * | 8/2004 | Holmgren et al. | 370/395.3 |
| 2004/0184450 A1 * | 9/2004 | Omran | 370/372 |
| 2004/0233847 A1 * | 11/2004 | Park et al. | 370/235 |
| 2005/0105524 A1 | 5/2005 | Stevens et al. | |
| 2005/0136972 A1 * | 6/2005 | Smith et al. | 455/554.1 |
| 2005/0157661 A1 | 7/2005 | Cho | |
| 2005/0190734 A1 * | 9/2005 | Khalil et al. | 370/338 |
| 2005/0223111 A1 | 10/2005 | Bhandaru et al. | |
| 2006/0056457 A1 | 3/2006 | Livet et al. | |
| 2006/0109801 A1 * | 5/2006 | Ashwood Smith | 370/256 |
| 2006/0250999 A1 * | 11/2006 | Zeng et al. | 370/312 |
| 2006/0265480 A1 | 11/2006 | Kim et al. | |
| 2006/0268749 A1 | 11/2006 | Rahman et al. | |
| 2006/0280152 A1 | 12/2006 | Lee et al. | |
| 2007/0060141 A1 | 3/2007 | Kangude et al. | |
| 2008/0170550 A1 * | 7/2008 | Liu et al. | 370/338 |

FOREIGN PATENT DOCUMENTS

| | | |
|---|---|---|
| JP | 07099490 | 4/1995 |

* cited by examiner

HYBRID DISTANCE VECTOR PROTOCOL FOR WIRELESS MESH NETWORKS

RELATED UNITED STATES PATENT APPLICATIONS

This Application is related to U.S. Provisional Patent Application Ser. No. 60/708,443 by Rahman et al., filed on Aug. 15, 2005, entitled "Hybrid Wireless Mesh Protocol,", assigned to the assignee of the present invention, and hereby incorporated by reference in its entirety.

This Application is related to U.S. Provisional Patent Application Ser. No. 60/703,829 by Rahman et al., filed on Jul. 29, 2005, entitled "A Hybrid Distance Vector Protocol Combining AODV (Reactive) and TBR (Proactive) Protocol Features for Wireless Mesh Networks,", assigned to the assignee of the present invention, and hereby incorporated by reference in its entirety.

TECHNICAL FIELD

Embodiments of the present invention pertain to the movement of information with a wireless mesh network.

BACKGROUND ART

There has been extensive work on both Tree Based Routing (TBR) and AODV (Ad Hoc On-demand Distance Vector) routing in the academia, industry, and in various standard bodies. These two wireless protocols are well developed and each has positive and negative points associated with it. For instance, a wireless mesh network following a TBR protocol transfers data in a structured, predefined, tree based path between mesh points in a network. This method of data transfer is very reliable, but it precludes shorter paths that may exist for intra-network transfer of information. In a wireless mesh network following an AODV protocol, mesh points can seek out and create shorter pathways for instance for intra-network transfers of information. This method regularly leads to shorter data path, however the process of establishing links between mesh points often floods the network with broadcasts of discovery requests and rebroadcasts of messages.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying," "hiding," "simplifying," "creating," "merging," "generating," "refining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Figure 1:
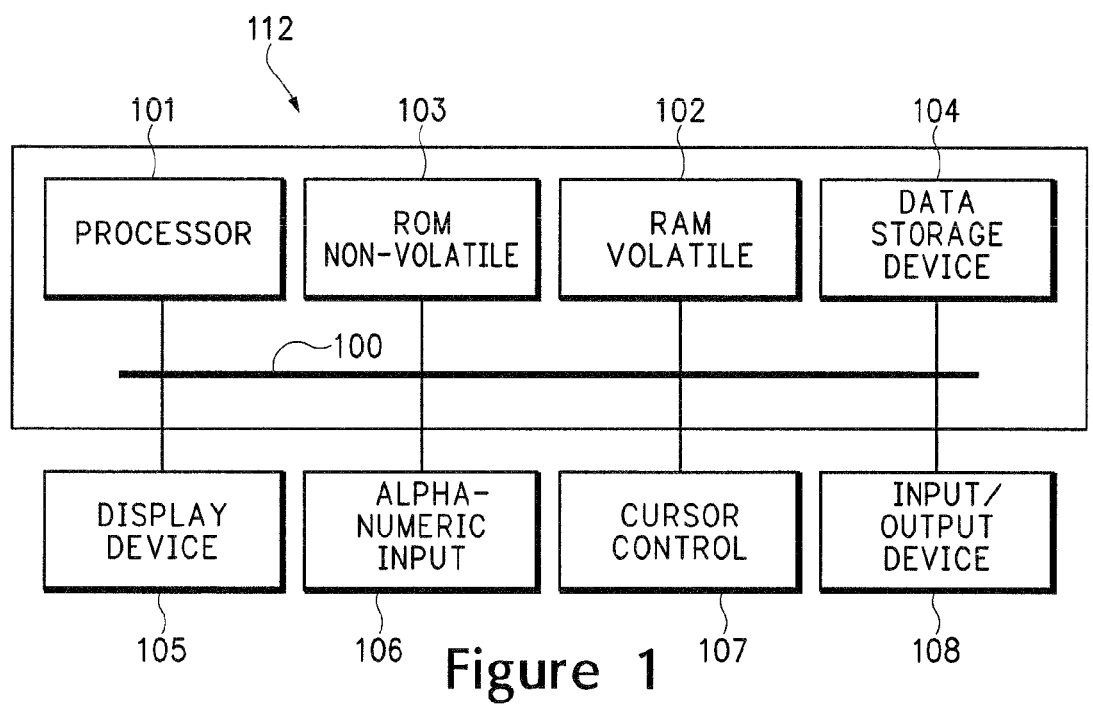
FIG. 1 is a block diagram of an exemplary computer system upon which embodiments of the present invention may be implemented.

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet, intranet (e.g., a local area network), wireless network, or wireless mesh network.

Exemplary Mesh Node

Figure 2:
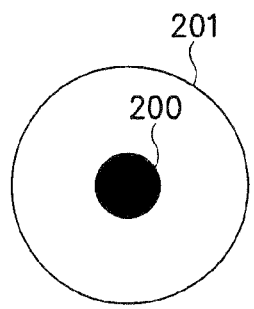
FIG. 2 is a block diagram of an exemplary wireless mesh network node, upon which embodiments of the present invention may be implemented.

With reference now to FIG. 2, an exemplary mesh node 200 is depicted, in accordance with one embodiment of the present invention. In most embodiments, mesh node 200 is configured to send and receive data wirelessly, e.g., using a wireless networking standard, such as 802.11. In some embodiments, mesh node 200 is connected to other mesh nodes or other networks using a physical connection. In some embodiments, both approaches are utilized.

Mesh node 200, in some embodiments, is intended to be utilized as part of a wireless mesh network, such as that described below, with reference to FIG. 3. In such embodiments, mesh node 200 can communicate with other mesh nodes or wireless devices, e.g. system 112, when those mesh nodes or wireless devices are within broadcast range of mesh node 200, as shown by circle 201.

In most embodiments, mesh node 200 is configured to allow a wireless device to connect to it, and through it to a mesh network. Mesh node 200 receives data from the wireless device, or from another mesh node, and forwards it, either to the intended destination, or to another mesh node in the mesh network. This process is described move fully below.

Wireless Mesh Network

With reference now to FIG. 3, a wireless mesh network 300 is depicted, in accordance with some embodiments of the present invention. Wireless mesh network 300, in the depicted embodiment, is composed of a number of mesh nodes 310, 320, 330, 340, 350, 360, and 370, and a device 399. Mesh node 310 is the root node, or "portal," where wireless mesh network 300 can connect to an outside internetworking connection, e.g., the Internet, via connection 301. Device 399, in the depicted embodiment, is a mobile device, e.g., a wireless portable computing device.

Wireless mesh network 300 implements a hybrid distance vector protocol (HDVP), in accordance with one embodiment of the present invention. HDVP combines a tree-like organizational structure with neighbor discovery to create a wireless mesh network with the advantages of both tree based routing (TBR), and ad-hoc on-demand distance vectoring (AODV), and without the limitations and problems inherent in either protocol.

A traditional TBR structure functions as follows. Upon power up, the portal determines that it is the root node of the tree structure, after detecting an internet connection. The portal then measures links to responsive mesh points. The portal can determine how many hops each node is from the root, as well as measure signal quality, signal strength, and other similar factors of the quality of the link from the mesh point to the portal. Where possible, mesh points that are lower quality are not used as the primary path. A primary path is chosen, which serves to prevent looping. This methodology propagates and eventually the whole network is mapped, quality is defined, and best paths are set up.

A typical AODV mesh operates as follows. AODV is a peer-to-peer arrangement, without an established infrastructure or topology like TBR. In AODV, when one mesh point is seeking a particular destination, it broadcasts a search for this destination within its broadcast range. If nothing is found, it broadcasts a second search to see if there is any other mesh point within the range of its broadcast. If nothing is found, then the search is over. If another mesh point is found, the found mesh point is asked if it can see the desired end destination. If this second mesh point can see the destination, a connection is then made through the second mesh point to the end destination, the best possible mesh connection is made and the packets are sent. All mesh points are independent and no permanent connections are maintained. Each mesh point knows which other mesh points can be reached, but connections are only created when they are needed. There is a lot of redundancy built in to the AODV system. A message can get forwarded to multiple mesh points, and an end user or destination can get several copies of a message or of a data packet. The network can be flooded with discovery broadcasts and by rebroadcasting of messages.

Figure 3A:
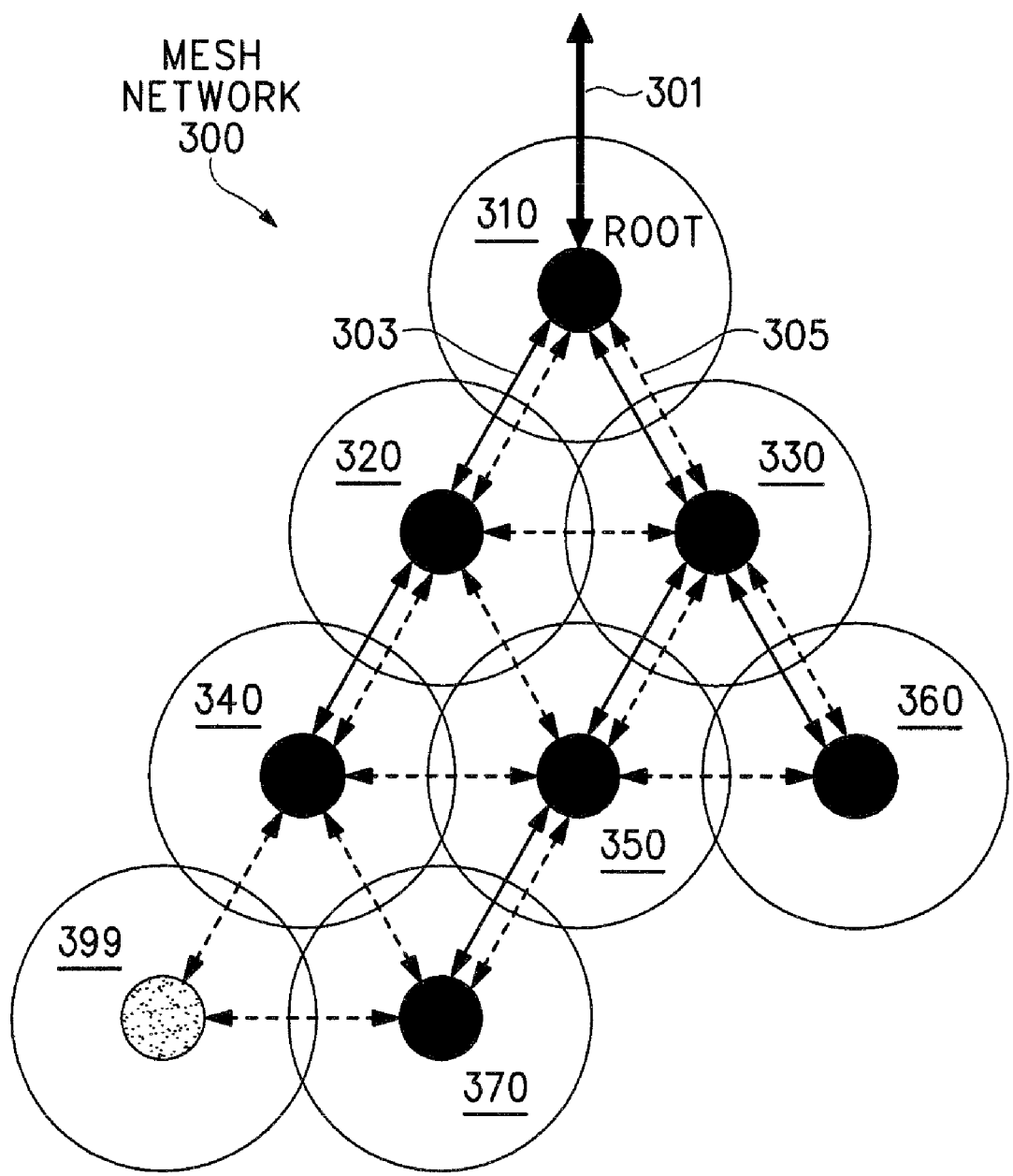
FIG. 3A is a block diagram of a wireless mesh network in which embodiments of the present invention have been implemented.

Under the tree-based structure shown in FIG. 3A, every mesh node has a route to the root node, mesh node 310, of wireless mesh network 300. The connections involved in this tree-based structure are represented as solid arrows, such as arrow 303. For example, mesh nodes 340 and 370 are linked by a route that passes through mesh nodes 320, 310, 330, and 350. A message passed from mesh node 340 to mesh node 370 through the tree structure would make five "hops"—from 340 to 320, from 320 to 310, from 310 to 330, from 330 to 350, and from 350 to 370.

The mesh nodes of wireless mesh network 300 are depicted as having a connection to every neighboring mesh node, represented by dashed arrows such as arrow 305. Through these neighbor connection paths, shorter routes for intra-network traffic may sometimes be established, than would be possible through the tree structure discussed above. For example, the five hop route from mesh node 340 to mesh node 370 described above, could be accomplished via a direct neighbor connection path between mesh nodes 340 and 370, a single hop route.

Methods and implementation details for utilizing both the tree structure and neighbor connection paths are discussed below, with reference to FIGS. 4, 5, and 6.

Figure 3B:
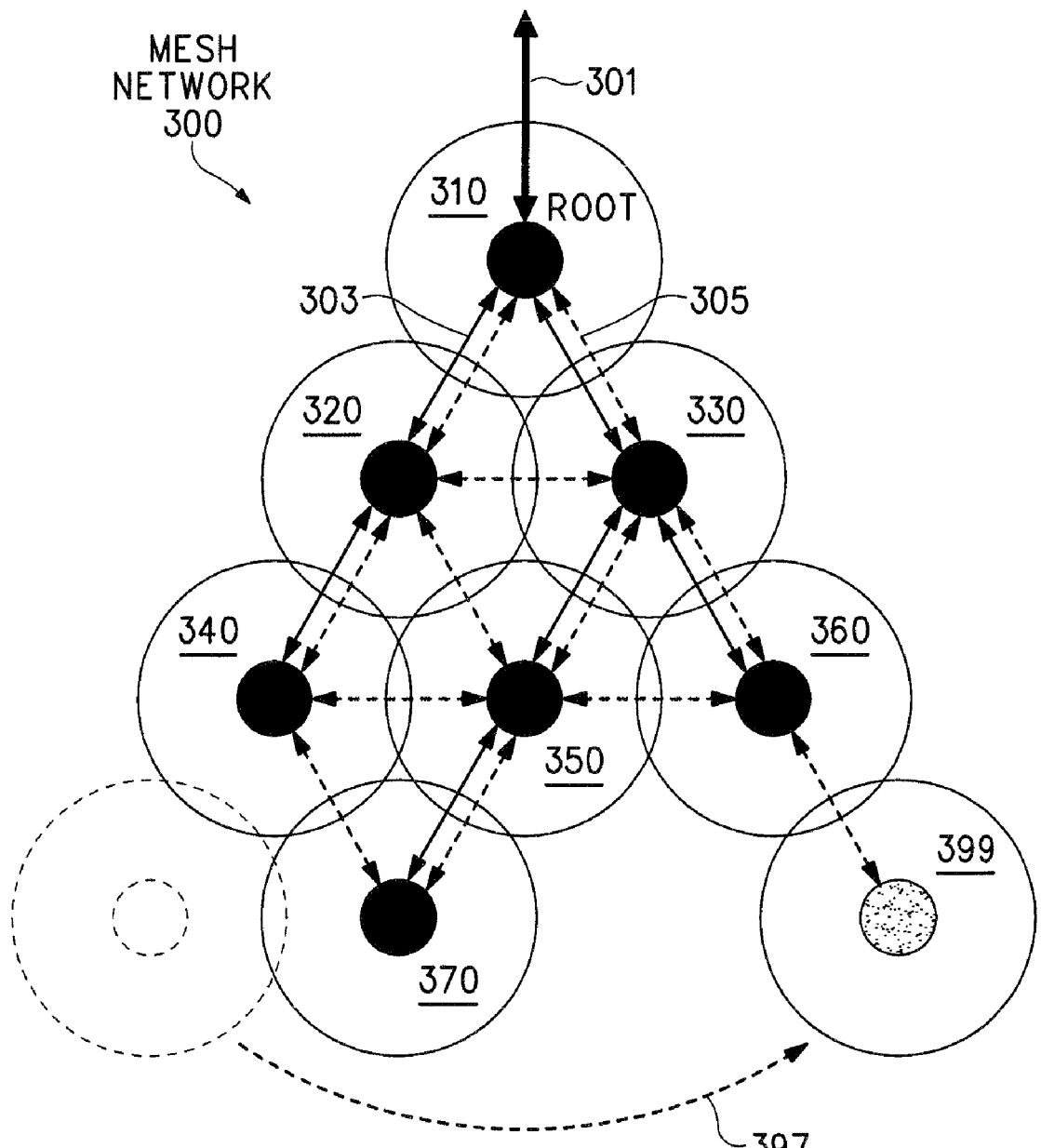
FIG. 3B is a block diagram of a wireless mesh network, wherein a mobile device is changing locations, in accordance with embodiments of the present invention.

With reference now to FIG. 3B, wireless mesh network 300 is depicted, in accordance with one embodiment of the present invention. FIG. 3B shows wireless mesh network 300, as described above, with one significant difference. Device 399 has moved, e.g., along the path represented by arrow 397, and is now connected to wireless mesh network 300 through a neighbor connection path leading to mesh node 360, rather than to mesh nodes 340 and 370, as in FIG. 3A. Implications of this transition are explored more fully below.

Methods of Mesh Point Discovery

Figure 4:
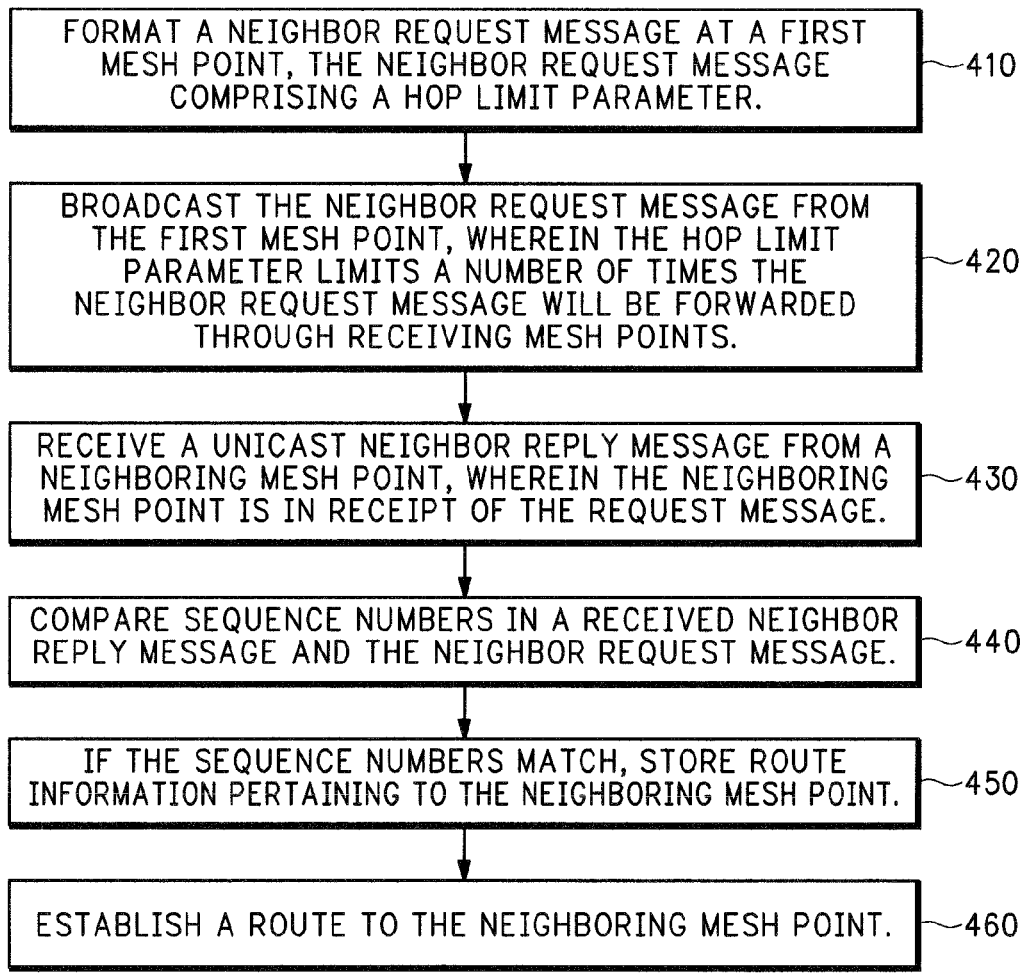
FIG. 4 is a flowchart of a method of mesh point discovery, in accordance with embodiments of the present invention.

With reference now to FIG. 4, a method of mesh point discovery is described, in accordance with one embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference now to step 410 and FIG. 3A, a route request message is formatted at a first mesh point, with the route request message including a hop limit parameter. In some embodiments, this route request message is designed to be sent out to all devices in broadcast range of a mesh node. The route request message serves to announce the presence of the mesh node to wireless mesh network 300. The hop limit parameter serves to limit the number of times the route request message will be rebroadcast by other mesh nodes, as explained below, with reference to step 420. For example, assume that device 399, upon entering into an area covered by wireless mesh network 300, formats a route request message, with a hop limit of one.

In some embodiments, the route request message also includes a sequencing number. These embodiments are explained more fully below, with reference to steps 440 and 450.

With reference now to step 420 and FIG. 3A, the route request message is broadcast from the first mesh point, with the hop limit parameter limiting the number of times the message will be forwarded by receiving mesh points. In this step, the route request message is broadcast across the coverage area of the mesh point, to be received by any other wireless mesh point in range. These receiving mesh points, in turn, can respond by transmitting a unicast route response message back to the originating mesh point, e.g., a directed transmission solely for receipt by the first mesh point.

The receiving mesh points can also rebroadcast the route request message. In an AODV network, similar rebroadcasting of neighbor request messages is unlimited, and continues until every mesh node in the network has received and responded to a message; this process can cause flooding, with numerous copies of a message traveling across the network. By including a hop limit in route request messages, a HDVP network can avoid this flooding issue, by limiting the number of times a route request message needs to be rebroadcast.

Continuing the example from above, if device 399 broadcasts a route request message with a hop limit parameter of 1, mesh nodes 340 and 370, both one hop away from device 399, will receive it and respond. Because the hop limit parameter was set to one, the message will not be rebroadcast. If the hop limit parameter had been set to two, mesh nodes 340 and 370 would have rebroadcast the route request message, and mesh nodes 320 and 350, two hops away from device 399, would have responded.

With reference now to step 430 and FIG. 3A, the originating mesh point receives a route response message from a neighboring mesh node. In most embodiments, these route response messages are unicast messages, e.g., directed solely to the originating mesh point, which serves to reduce surplus network traffic. In some embodiments, the route response message acknowledges receipt of the route request message, and provides details necessary to attempt to establish a connection between mesh points, e.g., a neighbor connection path.

Continuing the example, device 399 would receive separate, unicast route response messages from mesh nodes 340 and 370.

With reference to step 440, in embodiments where sequencing numbers are implemented, the originating mesh point compares the sequence number in the route response message with the sequence number of the most recent route request number. Sequence numbers can be used to act as a form of time stamping, and can help ensure that a particular route response corresponds to the most recent route request message.

With reference to step 450, if the sequence numbers of the route request and route response messages match, information pertaining to the neighboring mesh point is stored. Embodiments that utilize sequence numbers do so in order to avoid storing routes derived from stale information, e.g., responses to route request messages with a large hop limit parameter that do not return to the originating mesh point until significantly later.

With reference now to step 460 and FIG. 3A, a route is established between the originating mesh point and any responding mesh points. For direct neighbors, this step entails simply establishing a connection between the two mesh points. For nodes which are more than one hop away from the originating mesh point, a direct connection is not possible. Instead, a route involving intervening mesh points is established.

Continuing the example, device 399 would establish direct connections with nodes 340 and 370. If, however, the original route request message had been sent out with a hop limit of two, routes to nodes 320 and 350 would also be established, with the routes passing through nodes 340 and/or 370 as needed.

Monitoring Mesh Nodes Within a Wireless Mesh Network

Figure 5:
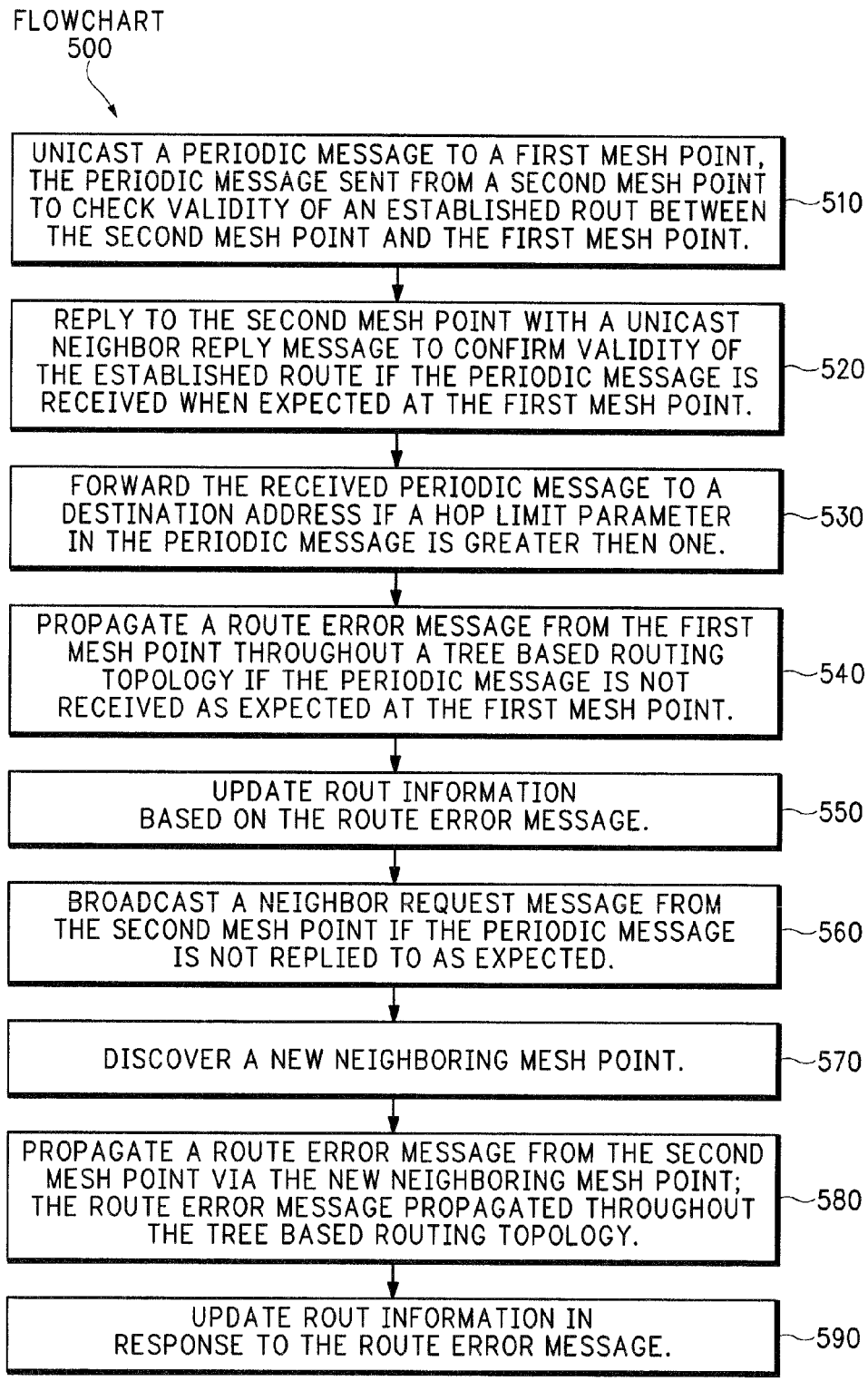
FIG. 5 is a flowchart of a method of monitoring mesh nodes within a wireless mesh network, in accordance with embodiments of the present invention.

With reference now to FIG. 5, a method for monitoring the status of mesh nodes within a wireless mesh network is described, in accordance with embodiments of the present invention. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference to step 510, the method calls for unicast periodic messages to be sent from one mesh node to another, to check the validity of a previously-established route. In some embodiments, this route can be a single-hop direct connection, e.g., a mesh point checking with neighboring mesh points in order to quickly identify any breaks in the network. In other embodiments, the route can be a multi-hop route, e.g., the root node periodically checking with endpoints to determine if one of the endpoints has disconnected from the network. Some embodiments incorporate both approaches. In some embodiments, these periodic messages are sent out from both sides of a route, such that if either endpoint of a route is no longer connected, the break will be detected.

With reference to FIGS. 3A and 3B, as well as step 510, an example can be illustrated. FIG. 3A depicts device 399 connected to mesh nodes 340 and 370. Periodically, mesh node 340 would transmit a message to device 399, to determine if the connection between mesh node 340 and device 399 was still valid. Similarly, root node 310, which connects wireless mesh network 300 and device 399 to the Internet, could transmit a message three hops down the tree structure to device 399, to ensure that device 399 was still connected by the same route.

Device 399 can also send out periodic messages, checking the validity of the connection with any node in wireless mesh network 300. For example, device 399 can send out periodic message, checking its connection with mesh nodes 340 and 370, the neighboring nodes, as well as with root node 310, its connection to the Internet.

With reference to step 520, the method calls for the contacted mesh point to respond to the periodic messages with a unicast reply, confirming the validity of the connection. If the periodic message is not received, or not received when expected, no confirmation reply is sent. Further, in some embodiments, if the message is not directed specifically to the receiving mesh point, no reply is sent. These last embodiments are often used in conjunction with step 530, discussed below.

Continuing the example from above, if device 399 receives a periodic message from mesh node 340, it can respond with a confirmation reply, validating the connection between node 340 and device 399. Similarly, if mesh node 340 receives a periodic message from device 399, a similar confirmation reply can be sent back to device 399.

With reference to step 530, the method allows for periodic messages to be forwarded to a destination address. Some embodiments incorporate the hop limit parameter detailed above, with reference to FIG. 4. In such embodiments, forwarding of periodic messages is limited to the hop limit parameter. Embodiments incorporating this step allow for route validation between mesh points which are not direct neighbors, e.g., are more than one hop away from each other.

Continuing the example, if root node 310 sends a periodic message to validate the connection with device 399, the message will first be received by node 320. Mesh node 320 is not the intended recipient, but is part of the route between node 310 and device 399. As such, node 320 should forward the periodic message along the known route, e.g., to node 340, if the hop limit parameter allows for rebroadcast. Node 340 is also not the intended recipient, but lies along the route between node 310 and device 399. As such, node 340 should also forward the periodic message along the route, here to device 399, if the hop limit parameter allows for rebroadcast.

With reference to step 540, the method calls for a route error message to be propagated throughout the tree-based structure, if a periodic message is not received as expected. In some embodiments, mesh nodes in the network expect to receive periodic messages at a predetermined time. If the message is not received, it is a sign that the route between two mesh points is broken, or that the mesh point that should have originated the periodic mesh point is not transmitting. In either case, some of the established neighbor connection paths through the mesh network are likely compromised. By propagating an error message using the tree structure, which touches every mesh point in the mesh network exactly once, no flooding of error messages is caused, and every mesh point that can be reached will be informed of the break.

Continuing the example from above, if node 370 expects to receive a periodic message from device 399, and does not, an error message will be propagated through the tree structure of wireless mesh network 300, which will provide notice to all affected nodes that any route to device 399 which passed through node 370 is no longer valid.

Figure 3C:
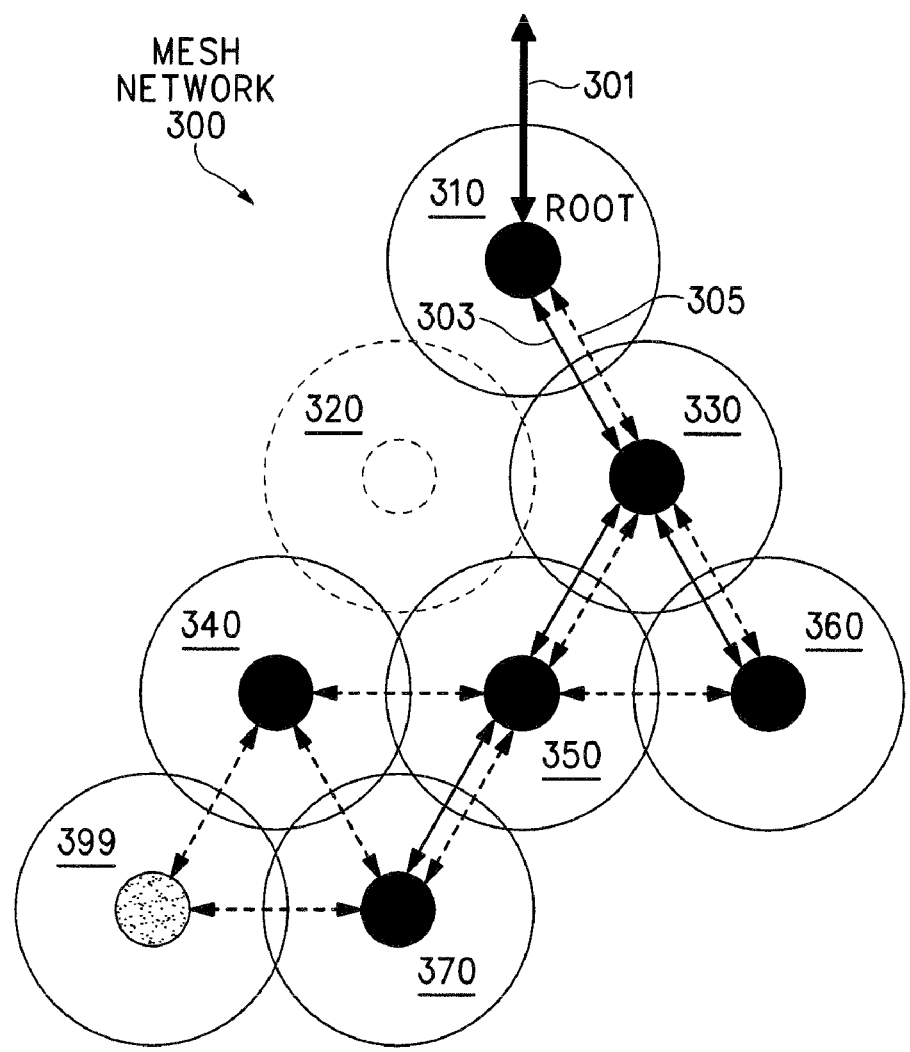
FIG. 3C is a block diagram of a wireless mesh network, wherein a mesh point has failed, causing a break in the network's tree structure, in accordance with embodiments of the present invention.

With reference now to FIG. 3C, in another embodiment, wireless mesh network 300 can utilize this method to repair a damaged tree structure. FIG. 3C shows wireless mesh network 300, where mesh node 320 has been removed, e.g., through a power outage. All mesh nodes that neighbor on mesh node 320 expect to receive a periodic message from mesh node 320, and will attempt to report a break in communications with node 320 using the tree structure. Mesh point 340 connected to the tree structure through node 320, and therefore, in this embodiment, cannot use the tree structure to send a route error message. However, mesh point 350 also expected a periodic message from node 320, and can report up the tree structure, through node 330, to root node 310. Root node 310, e.g., by using the methods detailed for establishing routes and connections, can rebuild the tree structure to circumvent node 320. In such a case, node 340 could be connected to node 350, thereby linking it back into the tree structure, and repairing the broken network. Approaches such as this allow for a self-diagnosing, self-healing mesh network.

With reference now to step 550, route information for the mesh network is updated to reflect the route error message sent out in step 540. Any existing routes that had the missing mesh point as an endpoint, or that passed packets through the missing mesh point, are no longer used, and less optimal routes, e.g., the tree structure, is used to transfer data until a new optimal route can be located.

With reference to FIG. 3A, for example, if node 340 is lost, the most direct path from device 399 to root node 310 is broken. Both device 399 and route node 310 may need to update stored routing information. A longer route, passing through mesh nodes 320, 350, and 370, can be utilized to pass data between device 399 and root node 310.

With reference to step 560, if a mesh point does not receive a confirming reply, in response to a periodic message it sent out, the mesh point broadcasts a new route request message. If an originating mesh point sent out a periodic message, and did not receive a confirmation reply from a destination mesh point, the connection between those two points is no longer valid. Such a situation could occur for several reasons, e.g., either the originating point or the destination moved out of range of the other, or the destination point is no longer receiving, or, in the case of multi-hop routes, some node along the route failed to forward the periodic message for any reason. In any of these cases, the originating mesh point should broadcast a route request message. If the originating point has lost its connection through movement, a new connection to the mesh network could be established. If the destination point lost its connection through movement, it could be reachable along a new route. If some intervening node along the former route is not functioning properly, an alternative route, albeit perhaps a longer one, might be located to reestablish a link.

With reference to FIGS. 3A and 3B, for example, device 399 is a mobile computing device. If, after establishing connections to nodes 340 and 370 as shown in FIG. 3A, device 399 is moved to the position shown in FIG. 3B, a periodic message directed to either nodes 340 or 370 will not result in a confirmation reply. As such, device 399 sends out a route request message, seeking a new connection to wireless mesh network 300.

In step 570, the originating node, in response to broadcasting a route request message in step 360, discovers a new neighboring mesh point. This can be accomplished, in some embodiments, through methods detailed above with reference to FIG. 4. Once a new neighboring mesh point is discovered, a new connection to the wireless mesh network can be established, and new routes discovered.

Continuing the previous example, after device 399 has moved to a new location, it can discover mesh node 360, and establish a connection with it, and to wireless mesh network 300.

In step 580, the originating node propagates a route error message, via the new connection, through the mesh network. In many embodiments, the route error message is propagated through the tree structure of the mesh network, ensuring that the message will reach all affected nodes. This route error message informs the mesh nodes of the network that old routes for reaching the originating node, or routes that passed through the originating node, are no longer valid. In some embodiments, the route error message also provides information necessary to establish new routes to the originating node.

Continuing the previous example, after device 399 has established a connection with mesh node 360, it propagates a route error message throughout mesh network 300, using the tree structure. The route error message essentially states that device 399 is no longer connected to wireless mesh network 300 through nodes 340 and 370, and is connected via node 360.

In step 590, route information is updated throughout the mesh network to reflect the changes detailed in the route error message. In some embodiments, any stored routes that reached the originating node via its old connection to the network, and any routes that passed through the originating node via its old connection to the network, are no longer valid. Further, in some embodiments, new routes are constructed to allow connections to the originating node via its new connection to the network. In some embodiments, the root node redirects outside packets addressed to the originating node to use these new routes.

Continuing the previous example, in response to the route error message sent out by device 399, the mesh nodes of wireless mesh network 300 which had previously established routes to device 399 are updated. Mesh nodes 340 and 370, for example, no longer expect device 399 to be directly connected. Root node 310 updates to reflect a new route from device 399 to the Internet, passing through mesh nodes 360 and 330.

A Method of Intra-Mesh Network Communication

Figure 6:
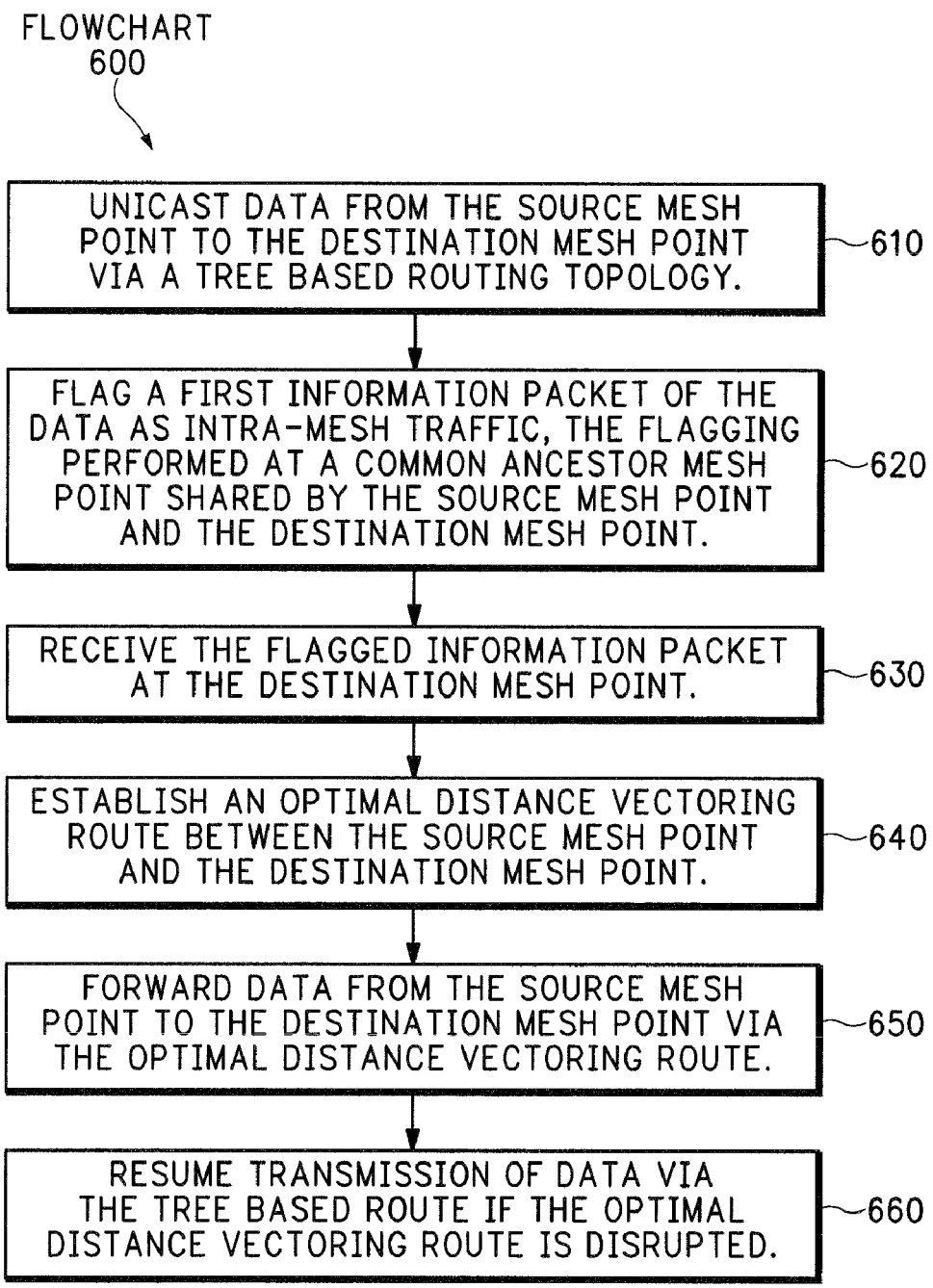
FIG. 6 is a flowchart of a method of intra-mesh network communication, in accordance with embodiments of the present invention.

With reference now to FIG. 6, a method of intra-mesh network communication is detailed, in accordance with embodiments of the present invention. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 610, unicast data is sent from a source mesh point to a destination mesh point, using the tree structure of a mesh network. If the source mesh point is not aware that the destination mesh point is in the same mesh network, it will send the data up the tree structure. When the data reaches a mesh point that is a common ancestor node to both the source mesh point and the destination mesh point, e.g., the root node, it can be sent down the tree structure to reach the destination mesh point.

For example, with reference to FIG. 3A, if mesh point 370 wants to transmit data to mesh point 360, it sends a unicast transmission up the tree structure to mesh node 350. Mesh node 350 is not a common ancestor to both mesh points 370 and 360, and so the data is passed up the tree structure to mesh point 330. Mesh point 330 is a common ancestor to both source and destination points, e.g., it has tree-based routes to reach both mesh point 370 and mesh point 360. As such, the data can be routed down the tree structure to reach the destination point, mesh point 360.

With reference now to step 620, the common ancestor node, upon recognizing that data is being passed intra-mesh, flags a packet. Flagging the packet header, in some embodiments, will allow the destination node to realize that data is being sent intra-mesh, as opposed to originating outside the mesh network.

Continuing the example from above, mesh point 330 will flag a data packet as being from mesh point 370, which is within the same mesh network as the destination point, node 360, before routing the packet to node 360.

With reference now to step 630, the destination point receives the flagged data packet.

Continuing the preceding example, the flagged data packet arrives at the destination node, mesh point 360.

With reference now to step 640, the destination point seeks to establish an optimal distance vectoring route between the source point and the destination point. In some embodiments, this is accomplished through the method described above, with reference to FIG. 4, e.g., sending out a route request message, seeking a route between the source point and the destination point. In some such embodiments, the common ancestor node can provide the destination node with the length of the tree-based path, e.g., the number of hops between the source point and the destination point while following the tree structure. In these embodiments, the route request message can include a hop limit parameter to prevent finding routes that are less optimal than the route through the tree structure. In other embodiments, the destination point could already know a more optimal route, e.g., through having had previous contact with the source point. While the destination point is seeking a more optimal route, and until the new route is established, data can continue to flow from the source point to the destination point along the tree structure.

Continuing the preceding example, mesh point 360 will send out a route request method, seeking a direct connection or a more optimal route for data to flow between mesh points 370 and 360. The route along the tree structure is three hops in length. Mesh point 360 could discover a two hop route, passing through node 350, and establish a route along that more optimal path.

With reference now to step 650, data is forwarded from the source point to the destination point, along the optimal distance vectoring route. This more optimal route is faster, as it involves fewer hops. Further, the more optimal route reduces the burden on the mesh network, as fewer mesh points need to be involved in routing the data packets.

In the ongoing example, data packets will travel along a route from mesh point 370, through mesh point 350, to mesh point 360, the destination point. So long as this optimal route is available, mesh point 330 is not used to route this traffic.

With reference now to step 660, data is routed along a tree-based route, if the optimal distance vectoring route is no longer available. If one of the nodes along the optimal route becomes unavailable, for whatever reason, data can be routed along the tree structure of the mesh network again. The tree structure, while not always the optimal route, is self-healing, which helps ensure continuity of data transfer with minimal or no interruption in data flow, even if the optimal route ceases being available. In some embodiments, when data transferal reverts to the tree structure, the common ancestor node will again flag a data packet, e.g., per step 620, which will cause the destination point to again seek a more optimal route, e.g., per steps 630 and 640.

Continuing the existing example, if mesh point 350 is disabled or shut down, the optimal route for data transferal between mesh points 370 and 360 is lost. In this particular example, the loss of mesh point 350 also breaks the old tree structure route between mesh points 370 and 360. However, in embodiments which implement the self-diagnosing, self-repairing mechanisms described above with reference to FIG. 3C, the break in the tree structure will be quickly repaired, with mesh point 370 connecting to the tree structure through, e.g., mesh point 340. The new tree-based route from mesh point 370 to mesh point 360 will run from node 370, to node 340, to node 320, to node 310, to node 330, and then to node 360.

Multiple Portals in a Single Mesh

Figure 7:
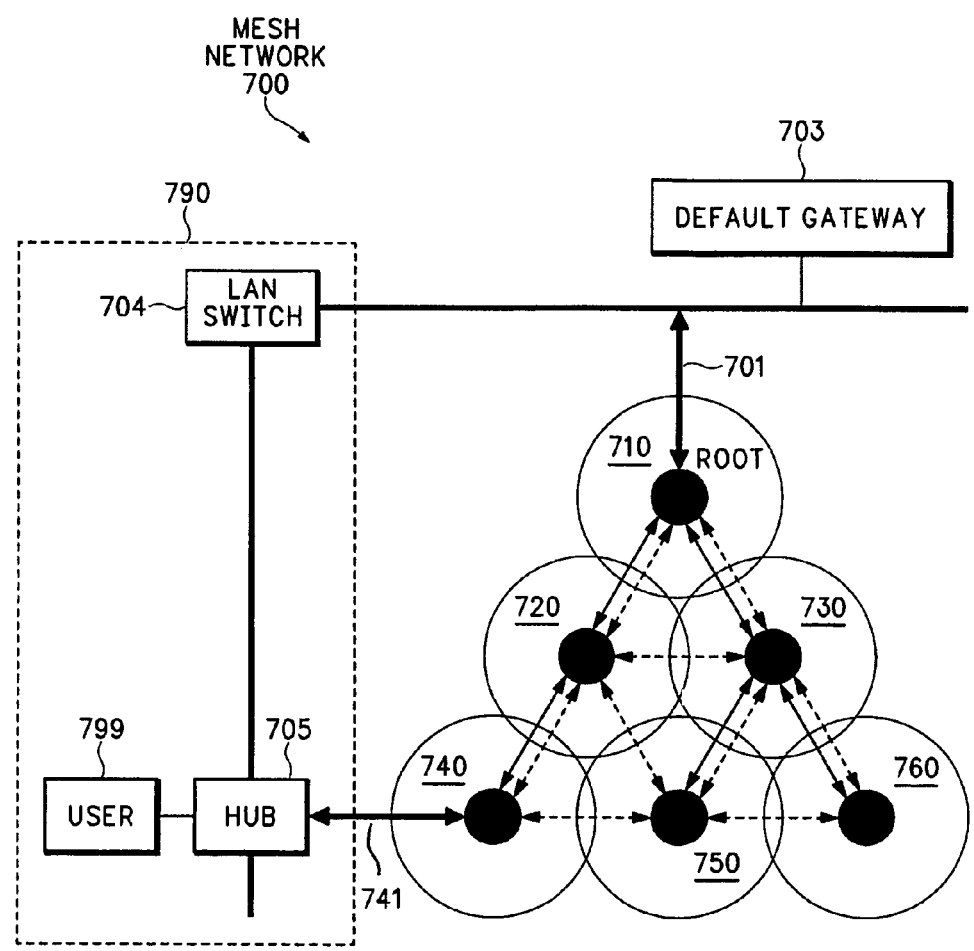
FIG. 7 depicts a wireless mesh network incorporating multiple portals, in accordance with one embodiment of the present invention.

With reference now to FIG. 7, a wireless mesh network 700 is depicted, in accordance with several embodiments of the present invention. Wireless mesh network 700 is analogous to wireless mesh network 300, in that it is depicted as being organized using the HDVP organizational structure. Unlike wireless mesh 300, however, wireless mesh network 700 incorporates multiple portals, e.g., the root portal 710, with uplink 701 to the default gateway 703 and LAN switch 704, and also non-root portal 740, with uplink 741 to hub 705. In one embodiment, the situation arises when wireless mesh network 700 is connected with an 802 LAN, e.g., LAN 790.

In order to properly and optimally route data across a connection to another LAN, the HDVP structure described above needs to be able to handle the multi-portal situation depicted in FIG. 7.

In one embodiment, portals connected to a wireless mesh network have roles as root and non-root portals, e.g., portal 710, the root node for wireless mesh network 700, is also the root portal for wireless mesh network 700, while portal 740 is a non-root portal. During a route discovery process, in one embodiment, mesh node 740 communicates the existence of uplink 741 up the tree based routing structure. Similarly, the loss of uplink 741 would be communicated during route maintenance. In such embodiments, root node 710 uses the tree based routing topology path to reach non-root portal 740 as necessary, as with any path to and from the root node.

In some embodiments that incorporate this multiple portal protocol, the root node 710 knows all mesh nodes within wireless mesh network 700. As such, any request for connection to an unknown destination entails transmitting the request outside wireless mesh network 700. In these embodiments, the root portal 710 will transmit the request via its own uplink 701, and also will forward the request to non-root portal 740, to broadcast via uplink 741. If and when a reply is received, the receiving portal will add it to a forwarding table, and establish an AODV route between the source and destination. Future to indication between the source and destination will follow this path, and will pass through the receiving portal.

For efficiency, all non-root portals in the wireless mesh network should send their a route report back to the root node for destinations located and reachable via their associated uplinks. Similarly, non-root portals need to send of Route error messages back to the root node for any expired or lost destinations. Also, the root node needs to send a route error message to any non-root portals that previously knew how to reach a destination now lost, or reachable via a different portal.

Figure 8:
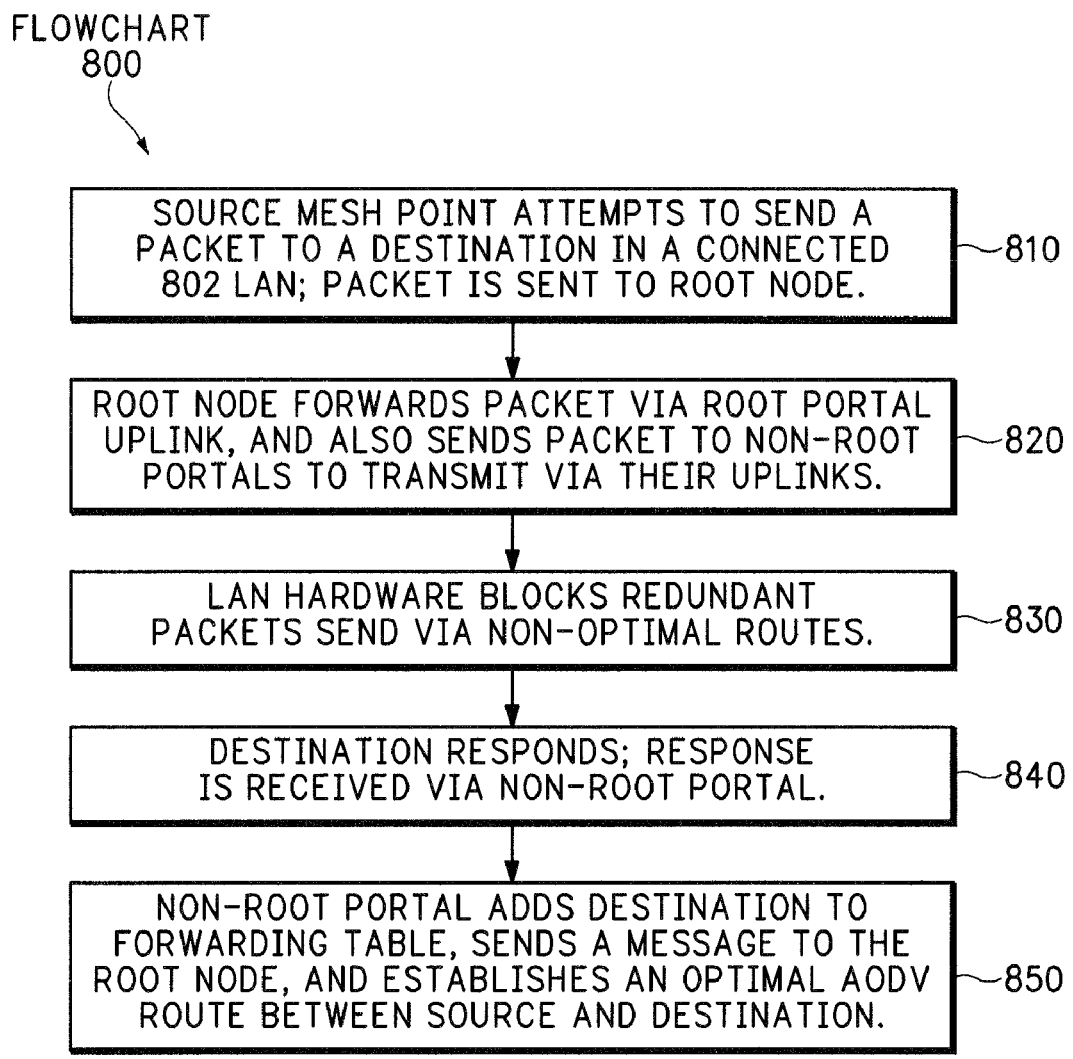
FIG. 8 depicts a flowchart of a method of utilizing a wireless mesh network with multiple portals connected to an 802 LAN, in accordance with one embodiment of the present invention.

With reference now to FIG. 8, a method of utilizing a wireless mesh network with multiple portals connected to an 802 LAN is depicted, in accordance with one embodiment of the present invention. Although specific steps are disclosed in flowchart 800, such steps are exemplary. That is, embodiments of the present invention are well suited to performing various other (additional) steps or variations of the steps recited in flowchart 800. It is appreciated that the steps in flowchart 800 may be performed in an order different than presented, and that not all of the steps in flowchart 800 may be performed.

With reference now to step 810 and FIG. 7, mesh nodes 730 tends to send a packet to user 799, a destination on a connected 802 LAN, LAN 790. Because user 799 is currently unknown, e.g., no route has been established between mesh node 730 and the user 799, mesh node 730 sends a packet up the tree based routing structure to root node 710.

With reference now to step 820 and FIG. 7, root node 710 forwards packets via uplink 701, and also routes the packet to portal 740, to allow it to be sent out via uplink 741.

With reference now to step 830 and FIG. 7, LAN switch 704 and/or hub 705, having received the same packet on different ports, will block transmission of one of the packets, e.g., the packet received via the least optimal route, here, the packet forwarded by root node 710 via uplink 701.

With reference now to step 840 and FIG. 7, user 799 replies to the packet forwarded by portal 740.

With reference now to step 850 and FIG. 7, portal 740 adds user 799 to its forwarding table, sends a gratuitous route reply to root node 710, and establishes an AODV route between mesh node 730 and user 799, e.g., from mesh node 730 to mesh node 750 to portal 740 to hub 705 to user 799. Future communication between mesh node 730 and user 799 can then use this route.

Embodiments of the present invention are thus described. While the present invention has been described in particular embodiments, it should be appreciated that the present invention should not be construed as limited by such embodiments, but rather construed according to the below claims.

What is claimed is:

1. A method comprising:
   receiving a unicast periodic message, said unicast periodic message for checking a validity of an established route between a mesh point and a destination point in a mesh network, wherein said mesh network comprises a spanning tree based routing topology connecting said mesh point to said destination point via a pre-defined tree based route of said spanning tree based routing topology comprising more hops than said established route, and wherein said spanning tree based routing topology is defined by a root node that connects each node in said mesh network with an Internet connection;
   forwarding said unicast periodic message to a designated destination address associated with said destination point via said established route;
   identifying a route error when a reply to said unicast periodic message is not received;
   broadcasting a route request message to a plurality of mesh points in said mesh network comprising said mesh point and said destination point to determine a new optimal route between said mesh point and said destination point, wherein said route request message is broadcast using a hybrid ad-hoc on-demand distance vectoring (AODV) protocol that includes a maximum hop count comprising fewer hops than said pre-defined tree based route, and wherein said new optimal route replaces said established route; and transmitting a unicast data packet from said mesh point through said pre-defined tree based route to said destination point until said new optimal route is established.

2. The method of claim 1, further comprising:

establishing said new optimal route based on a reply to said route request message, wherein said route request message is wirelessly broadcast;

transmitting a unicast route error message to said root node of said spanning tree based routing topology for updating route information between said mesh point and said destination point, wherein said unicast route error message is propagated to each node using said spanning tree based routing topology, and wherein each node receives a single instance of said unicast route error message; and updating said route information maintained at said root node based on said unicast route error message.

3. The method of claim 1 wherein a common ancestor node of said mesh point and said destination point flags said unicast data packet as being transmitted intramesh within said mesh network, wherein said route request message is broadcast in response to receiving said flagged unicast data packet, and wherein said common ancestor node is communicatively located between said root node and said mesh point in said spanning tree based routing topology.

4. The method of claim 3 wherein said common ancestor node is configured to transmit said unicast data packet to said destination point without said unicast data packet having been received by said root node of said spanning tree based routing topology.

5. The method of claim 1 further comprising:

identifying an origin of said unicast data packet; and flagging said unicast data packet if said origin is located inside outside of said mesh network.

6. The method of claim 1 further comprising:

propagating a route error message throughout said spanning tree based routing topology to avoid flooding a network with duplicate route error messages, wherein said route error message is propagated to each mesh point in said spanning tree based routing topology; and updating route information maintained at said root node based on said route error message.

7. The method of claim 1 wherein said spanning tree based routing topology identifies a predetermined spanning tree routing path connecting said mesh point to said destination point, and wherein said predetermined spanning tree routing path comprises more hops than said established route.

8. An apparatus for maintaining a route in a mesh network comprising a plurality of mesh points, said apparatus comprising:

means for transmitting a unicast periodic message from a source point, said unicast periodic message for checking a validity of an established route between said source point and a destination point in said mesh network;

means for receiving a unicast route reply message, said unicast route reply message for confirming the validity of said established route;

means for temporarily transmitting a unicast data packet through a spanning tree based routing topology of said mesh network if said established route is not valid, until a new route between said source point and said destination point is established, wherein said spanning tree based routing topology provides a pre-defined route between said source point and said destination point, wherein said spanning tree based routing topology is defined by a root node that connects said mesh network with a network gateway, and wherein said pre-defined route comprises more hops than said established route;

means for flagging said unicast data packet as being transmitted intramesh;

means for wirelessly broadcasting, responsive to receiving said flagged unicast data packet, a routing request to one or more of said plurality of mesh points to establish said new route, using a hybrid ad-hoc on-demand distance vectoring (AODV) protocol, wherein said one or more mesh points forward said routing request through said spanning tree based routing topology according to a hop limit parameter contained within said routing request; and means for identifying said new route based on responses to said routing request that indicate a shortest path between said source point and said destination point.

9. The apparatus of claim 8 wherein said hop limit parameter allows fewer hops than said pre-defined route.

10. The apparatus of claim 8, wherein each of the plurality of mesh points are connected through the spanning tree based routing topology, and wherein the spanning tree based routing topology only includes one root node.

11. An apparatus, comprising:

means for receiving an anticipated unicast periodic message into a mesh point, said anticipated unicast periodic message for validating an established route between a source point and a destination point in a mesh network;

means for transmitting a unicast route reply message in response to receiving said anticipated unicast periodic message, said unicast route reply message for confirming the validity of said established route;

means for transmitting a unicast error message through a pre-defined route of a spanning tree based routing topology of said mesh network if said established route is not valid, wherein each node in said mesh network receives a single instance of said unicast error message, and wherein said spanning tree based routing topology is defined by a root node that connects said mesh network with a network gateway;

means for receiving a wireless routing request comprising a hop limit parameter, wherein said wireless routing request is broadcast from said source point using a hybrid ad-hoc on-demand distance vectoring (AODV) protocol;

means for transmitting a unicast data packet from said source point to said destination point along said pre-defined route until a new route between said source point and said destination point is identified, wherein said pre-defined route contains more hops between said source point and said destination point than said established route; and means for identifying said new route between said source point and said destination point based on responses to the wireless routing request, wherein said new route contains fewer hops than said pre-defined route.

12. The apparatus of claim 11, wherein said unicast data packet is flagged by a common ancestor node of both said source point and said destination point, and wherein said wireless routing request is broadcast in response to receiving said flagged unicast data packet.

13. A mesh point in a mesh network, said mesh point comprising:

a transmitter configured to transmit a unicast periodic message, said unicast periodic message for checking a validity of an established ad hoc distance vector route between said mesh point and a destination point, wherein said mesh network is organized as a spanning tree routing topology connecting each mesh point in the mesh network, and wherein said spanning tree routing topology is defined by a root node that connects said mesh network with a network gateway;

a memory, for storing information, coupled to said transmitter; and a receiver coupled to said memory, wherein said receiver, in response to said unicast periodic message, is configured to receive a unicast route reply message, said unicast route reply message for confirming the validity of said established ad hoc distance vector route, wherein upon a failure to receive said unicast route reply message, said mesh point is configured to:

transmit a unicast data packet through a pre-configured path of said spanning tree routing topology connecting said mesh point to said destination point until a new route can be established that contains fewer hops than said pre-configured path; and receive a broadcast route request message, wherein said broadcast route request message is transmitted responsive to said unicast data packet being flagged as originating within said mesh network, wherein said broadcast route request message is transmitted using a hybrid ad hoc on-demand distance vector (AODV) protocol that includes a maximum hop count comprising fewer hops than said pre-configured path, and wherein said new route is determined based on route response messages to said broadcast route request message that indicate a shortest path between said mesh point and said destination point.

14. The mesh point of claim 13, wherein said broadcast route request message is forwarded throughout said spanning tree routing topology according to said maximum hop count.

15. The mesh point of claim 13 wherein said established ad hoc distance vector route contains fewer hops than said pre-configured path.

16. A mesh point in a mesh network comprising:
a memory, for storing route information;
a wireless receiver, coupled to said memory, for receiving messages, wherein said receiver is configured to receive an anticipated unicast periodic message, said anticipated unicast periodic message for validating an established ad hoc distance vector route between a source point and a destination point of said mesh network, wherein said mesh network is organized as a spanning tree routing topology connecting each mesh point in the mesh network, and wherein said spanning tree routing topology is defined by a root node that connects said mesh network with a network gateway; and
a transmitter, coupled to said memory, for transmitting messages, wherein said transmitter is configured to transmit a unicast route reply message for confirming the validity of said established ad hoc distance vector route, wherein upon a failure to receive said anticipated unicast periodic message, said transmitter is configured to:
transmit a unicast data packet through a pre-configured route of said spanning tree routing topology connecting said source point to said destination point until a new ad hoc distance vector route can be established between said source point and said destination point, and wherein said new ad hoc distance vector route contains fewer hops than said pre-configured route;
flag said unicast data packet as being transmitted intramesh; and
receive a broadcast route request message, responsive to said flagged unicast data packet, wherein said broadcast route request message is broadcast using a hybrid ad hoc on-demand distance vector (AODV) protocol that includes a hop limit parameter comprising fewer hops than said pre-configured path, and wherein said new route is determined based on route response messages to said broadcast route request message that indicate a shortest path between said source point and said destination point.

17. The mesh point of claim 16, wherein, if said hop limit parameter in said anticipated unicast periodic message is greater than one, said transmitter is configured to forward said anticipated unicast periodic message along said established ad hoc distance vector route, and wherein said established ad hoc distance vector route contains fewer hops than said pre-configured route.

18. The mesh point of claim 16, wherein, if said anticipated unicast periodic message is not received, said transmitter is configured to propagate a route error message from said mesh point throughout said spanning tree routing topology to avoid flooding said mesh network with duplicate route error messages, and wherein said memory is configured to update stored route information to reflect said route error message.

19. A method comprising:
receiving, into a root node of a wireless mesh network, a packet from a mesh node within said wireless mesh network and directed towards a destination in a connected local area network (LAN), wherein said LAN is a separate network from said wireless mesh network;
transmitting said packet to said LAN via a root portal, wherein said root portal connects said root node of said wireless mesh network to said LAN;
forwarding said packet to one or more non-root nodes of said wireless mesh network, each of said one or more non-root nodes associated with a non-root portal, wherein said non-root portal connects said wireless mesh network to said LAN;
receiving at said root node a gratuitous route reply from said one or more non-root nodes via a spanning tree based routing topology of said wireless mesh network defined by said root node, wherein said gratuitous route reply indicates that said destination was reached via said one or more non-root portals; and
establishing a hybrid ad hoc on-demand distance vector (AODV) route between said destination and said mesh node, wherein said AODV route comprises a path including said one or more non-root nodes that sent said gratuitous route reply.

20. The method of claim 19 wherein said one or more non-root nodes communicate an existence of said non-root portal with said root node via said spanning tree based routing topology of said wireless mesh network.

* * * * *

UNITED STATES PATENT AND TRADEMARK OFFICE
CERTIFICATE OF CORRECTION

PATENT NO.         : 7,787,361 B2
APPLICATION NO.    : 11/364020
DATED              : August 31, 2010
INVENTOR(S)        : Shahriar Rahman It is certified that error appears in the above-identified patent and that said Letters Patent is hereby corrected as shown below:

On column 13, line 38, CLAIM 5, after "inside" delete "outside of".

Signed and Sealed this
Eighth Day of May, 2012

David J. Kappos
*Director of the United States Patent and Trademark Office*